US012786125B1

United States Patent

(12) United States Patent
(10) Patent No.: US 12,786,125 B1
(45) Date of Patent: Nov. 3, 2026

Kapadnis et al.

(54) SCALABLE CONNECTIVITY BETWEEN CLOUD GATEWAYS AND DYNAMICALLY CONFIGURED VIRTUAL APPLIANCES

(71) Applicant: Amazon Technologies, Inc., Seattle, WA (US)

(72) Inventors: Jaywant U Kapadnis, Sterling, VA (US); Baihu Qian, Chicago, IL (US); James Matthew Gordon, Arlington, VA (US); Dimitrios R Daskalakis, Vienna, VA (US); Omer Hashmi, Bethesda, MD (US); Gaurav Sabharwal, Aldie, VA (US); Bashuman Deb, Aldie, VA (US); Indira Radhika Pulla, Aldie, VA (US); Biju Raman, Fremont, CA (US); Brandon Michael LaRue, Falls Church, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/090,206

(22) Filed: Mar. 25, 2025

(51) Int. Cl.
*H04L 45/76* (2022.01)

(52) U.S. Cl.
CPC .................................... *H04L 45/76* (2022.05)

(58) Field of Classification Search
CPC ........................................................ H04L 45/76
See application file for complete search history.

(56) References Cited

U.S. PATENT DOCUMENTS

| | | | | |
|---|---|---|---|---|
| 10,742,554 | B2 | 8/2020 | Deb et al. | |
| 10,757,009 | B2 | 8/2020 | Deb et al. | |
| 10,958,690 | B1 | 3/2021 | Badhwar | |
| 11,196,591 | B2 | 12/2021 | Hira | |
| 11,374,794 | B2 | 6/2022 | Hira | |
| 12,489,707 | B1 * | 12/2025 | Deb | H04L 45/033 |
| 12,592,887 | B1 * | 3/2026 | Sharma | H04L 45/02 |

OTHER PUBLICATIONS

U.S. Appl. No. 17/548,391, filed Dec. 10, 2021, Ammar Latif, et al.

* cited by examiner

*Primary Examiner* — Minh Chau Nguyen
(74) *Attorney, Agent, or Firm* — Robert C. Kowert; Kowert, Hood, Munyon, Rankin & Goetzel, P.C.

(57) ABSTRACT

A multi-appliance logical connection is created between a transit gateway (TGW) of a cloud computing environment and a group of network addresses of a first virtual private cloud (VPC). As addresses of the group are assigned to software-defined appliances, respective communication sessions of a routing information exchange protocol are established between the appliances and the TGW. The TGW routes packets associated with a second VPC to next-hop targets indicated in routing information received via the sessions.

20 Claims, 10 Drawing Sheets

SCALABLE CONNECTIVITY BETWEEN CLOUD GATEWAYS AND DYNAMICALLY CONFIGURED VIRTUAL APPLIANCES

BACKGROUND

Cloud provider networks provide an extensive array of virtualized computing and networking features. For example, isolated virtual networks referred to as virtual private clouds (VPCs) can be established to host various types of customer applications running on virtual machines or compute instances, and networking components such as virtual gateways can be configured for routing traffic for the applications. Customers can, if desired, set up virtual appliances using cloud resources to perform various kinds of tasks such as packet inspection, logging and the like. As the number of networking components of a given cloud customer increases, configuring all the components to work together can pose a non-trivial challenge.

Figure 1:
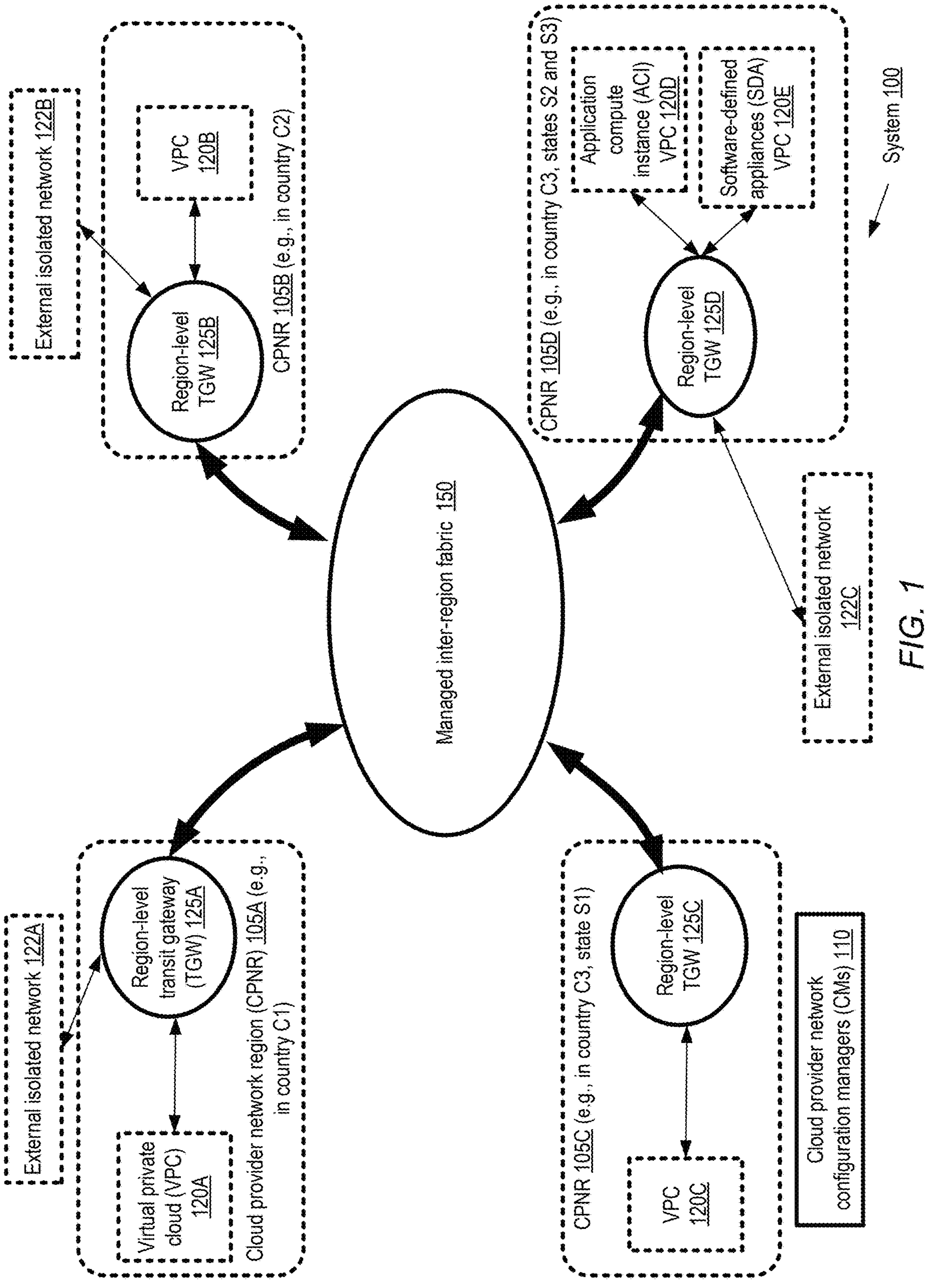
FIG. 1 illustrates an example system environment in which a wide-area network comprising virtual private clouds including software-defined appliances in multiple regions of a cloud computing environment may be configured using transit gateways, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

Cloud computing environments provide customers with the ability to set up global wide area networks (WANs) which include both cloud provider resources and resources located at customer premises spread across multiple geographies. Traffic between the resources is transmitted over a cloud-managed high-speed fabric connecting various regional data centers of the cloud, with respective transit gateways (TGWs) being set up in the different regions to act as routing intermediaries. Some customers deploy third party software-defined wide area network (SD-WAN) appliances and other types of virtual appliances to perform traffic management tasks including security-related inspections of packets, logging, exchange of routing information with TGWs and the like. As enterprises expand their cloud footprints across multiple virtual private clouds (VPCs) in different regions, and set up large numbers of virtual appliances dynamically for load balancing reasons or to implement new types of traffic management tasks, maintaining connectivity with the virtual appliances consistently based on the customers' policies becomes increasingly challenging. Existing solutions often require complex setup steps per virtual appliance, leading to operational overhead and potential errors. There is a need for a more scalable approach towards managing connectivity between virtual appliances and other resources linked via networking components such as transit gateways across an organization's entire cloud infrastructure.

The technology of the present disclosure addresses these challenges by providing a new type of logical connection which can be used for communication with multiple virtual appliances. This approach allows administrators to specify groups of network addresses, such that a newly created virtual appliance to which one of the addresses is assigned can automatically establish Border Gateway Protocol (BGP) sessions over the logical connection with a TGW without additional configuration steps. The technology also supports simplified definition of multiple network segments, enabling traffic of client-defined or customer-defined network segments sent via the logical connections to be processed using segment-specific rules at the transit gateways. This enables organizations to consistently configure arbitrary numbers of virtual appliances and network segments throughout their global WANs with significantly reduced operational complexity compared to existing solutions.

The present disclosure relates to methods and apparatus for enabling scalable connectivity at cloud provider networks between TGWs and dynamically configured virtual appliances. TGWs can be set up at the request of cloud provider networks to facilitate routing of network packets between a variety of otherwise isolated networks, such as virtual private clouds (VPCs) created for cloud customers in one or more geographic regions and customer-managed networks in premises external to the cloud in the different regions. For clients that wish to use a high-performance managed fabric of the cloud provider for a multi-region wide area network (WAN), respective TGWs can be established in different regions to serve as exit and entry points for inter-region traffic. VPCs in a given region can be programmatically attached to a regional TGW, and external premise networks can be connected to the regional TGW via technologies such as virtual private network (VPN) tunnels or dedicated high-performance physical links referred to as "direct connect" links. Network packets directed to other regions from a given region can then flow to the region's TGW from the VPCs and linked external networks, from the given region's TGW to TGWs in other regions via the managed fabric of the cloud provider, and from the TGWs in other regions to their intended destinations.

For some applications run in WANs and other configurations, customers of a provider network can set up virtual appliances to perform various kinds of network functions. Such virtual appliances (VAs) or software-defined appliances (SDAs) can be configured, for example, to exchange routing information with regional TGWs using protocols such as BGP, to perform packet inspection or other types of security tasks on data packets, to store logs of network traffic in a format selected by the customers, and so on. In effect, SDAs can be configured as packet processing intermediaries or "bumps in the wire" for certain kinds of packets: for example, at least part of the routing information provided to a TGW by an SDA can cause the TGW to route such packets using the SDA as the next hop. SDAs can at least in some cases use messages sent to TGWs to inform the TGWs about the kinds of routes whose packets the SDAs themselves are willing to accept, so that the SDAs can be injected as intermediaries to perform packet processing tasks selected by the client on those packets. As such, not all the packets transmitted via a TGW need necessarily be sent via SDAs.

SDAs (some of which are referred to as software-defined WAN or SD-WAN appliances or virtual routers) can be set up using compute instances or virtual machines of a virtualized computing service (VCS) of the cloud computing environment. In some cases, chains or groups of SDAs for performing different network functions can be configured (e.g., on respective software containers run on compute instances) within a VPC set up for a customer in a given region which includes a regional TGW. As the customer's traffic level within a given region increases, multiple SDAs that all perform the same type of network functions can be set up to avoid overloading any given SDA; as the traffic level decreases, some of the multiple SDAs may be decommissioned. In order for the SDAs to be utilized in the manner intended by the customer, connectivity has to be established and maintained between TGWs and potentially large groups of dynamically configured SDAs. Establishing such connectivity on a per-SDA basis can be a tedious and error-prone process.

To help alleviate such problems, configuration managers or control plane components of the cloud computing environment can establish a multi-appliance logical connection (MALC) to enable communication between a given TGW and a group of network addresses within a VPC in which virtual appliances are configured. An MALC can, for example, be created in response to a client request which indicates the group of network addresses and other configuration details such as preferred encapsulation protocols to be used for routing information exchange. At least some of the network addresses may not actually be in use at the time of the creation of a given MALC; as such, SDAs that are configured later (e.g., using auto-scaling rules chosen by the customer to adapt to changes in workloads) can automatically make use of the MALC. Packets of the MALCs can be transmitted to and from the TGW via an underlying transport attachment created earlier between the appliance-containing VPC and the TGW. Subsequent to assignment, to a given SDA, of a given address within the group of network addresses, a BGP session (or a session of some other routing information exchange protocol chosen by the client on whose behalf the MALC is set up) can be established automatically over the MALC between the given SDA and the TGW. Such sessions can, for example, be set up using configuration details provided earlier by the client when requesting establishment of the MALC, without requiring additional configuration steps from the client. As more SDAs are set up with addresses within the group, corresponding BGP sessions can also be established. The TGW can utilize routing information obtained via the BGP sessions to route data packets to the desired next hops, e.g., to the SDAs themselves, or to other next hops specified in the routing information.

As one skilled in the art will appreciate in light of this disclosure, certain embodiments may be capable of achieving various advantages, including some or all of the following: (a) considerably reducing the amount of resources and time used to establish connectivity between virtual appliances and cloud networking intermediaries such as TGWs and/or (b) substantially reducing the occurrences of scenarios in which human errors cause packets flowing in complex cloud configurations such as global cloud WANs to be lost or misdirected, which can potentially occur if virtual appliances get overloaded or are not correctly configured to communicate with TGWs.

According to some embodiments, a system may include a configuration manager (CM) of a cloud computing environment or cloud provider network (e.g., a configuration manager of a virtualized computing service (VCS) of the cloud computing environment), a transit gateway (TGW), and a set of virtual private clouds (VPCs) established for a client or customer. In one embodiment, the TGW may comprise a set of logical nodes of a packet processing service (PPS) of the cloud provider network, comprising software run on one or more physical or virtual computing devices. In at least some embodiments, the TGW may comprise a BGP engine or BGP daemon that can set up communication sessions (using one or more BGP variants such as External BGP or EBGP, multi-protocol BGP or MP-BGP and the like) with other networking devices or components comprising BGP engines or daemons. In other embodiments, the TGW may also or instead comprise software for conduction routing information exchange sessions using protocols other than BGP or its variants.

In various embodiments, the set of VPCs may include a first VPC configured to host a group of software-defined appliances (SDAs) and at least a second VPC comprising VCS compute instances that are used to run applications of the client. The CM may create a multi-appliance logical connection (MALC) for communication between the TGW and a group of network addresses of the first VPC. The group of network addresses may include one or more addresses that are currently assigned to SDAs, or intended to be assigned later to newly configured SDAs. The groups of network addresses may be specified using a variety of approaches in different implementations, such as by specifying a Classless Inter-Domain Routing (CIDR) block or by specifying a subnet identifier. Packets sent using the multi-appliance logical connection may be transmitted via a transport attachment established earlier, e.g., in response to a programmatic request to enable connectivity between the TGW and the first VPC in at least some embodiments. In such embodiments, after establishment of the first VPC and the TGW, the client may submit a first request to programmatically attach the first VPC and the TGW, resulting in a transport attachment, with a transport attachment identifier being provided to the client. The client may then send one or more additional programmatic requests (in at least some of which the transport attachment identifier is provided as a parameter) to request the creation of the MALC. MALCs can also be referred to in some embodiments by other names such as multi-appliance peerings, multi-appliance peering associations, multi-appliance peering attachments, multiplexed peerings, multiplexed peering associations, dynamic connect peers, or multiplexed peering attachments.

If and when a network address of the group of addresses which was specified in a request to establish an MALC is assigned to an SDA, a BGP session may be caused to be established between that SDA and the TGW in various embodiments, for example without requiring the client to request or perform any additional configuration operations. As such, once an MALC has been configured using configuration details provided by the client for use for connectivity with potentially large numbers of SDAs, no additional configuration details may be required when such SDAs are launched. The additional SDAs may themselves be launched automatically based on auto-scaling rules/requests indicated by the client via programmatic interfaces in some embodiments. For example, the client may submit a programmatic request to auto-scale SDAs based on increases in the rate at which packets are generated at specified isolated networks or received at existing SDAs. As more SDAs are set up on behalf of the client in the first VPC, corresponding BGP sessions (or sessions of other routing information exchange protocols) may be created for communication between individual ones of the SVDAs and the TGW. The TGW may obtain routing information (e.g., pertaining to one or more virtual networks of the client) in individual ones of the sessions, and provider routing information (pertaining to resources such as compute instances in various other VPCs of the client) to the SDAs in various embodiments. Using the routing information it receives, the TGW may route data packets associated with (e.g., being sent to or from) respective compute instances within the second VPC to next-hop targets indicated in the received routing information in at least some embodiments. In some embodiments, at least a portion of the routing information received at a TGW from an SDA may indicate the SDA itself as a next-hop target for some packet flows originating at a client-application VPC or at an external premise.

In at least some embodiments, messages comprising routing information (e.g., BGP messages) may be transmitted between SDAs and TGWs using encapsulation protocols. For example, tunnels configured or established using the Generic Routing Encapsulation (GRE) protocol and/or the Generic Network Virtualization Encapsulation (Geneve) Protocol may be used in some embodiments. In at least one embodiment, an encapsulation protocol may not be used. In various embodiments, any of several classes of SDAs may be set up by a client and used for exchanging routing information with a TGW. For example, an SDA may comprise an SD-WAN appliance, a security inspection appliance, a logging appliance or the like. In at least some embodiments, to ensure that failures in a given availability zone of the provider network cannot impact availability with respect to traffic flows between SDAs in other availability zones and TGWs, configuration managers may choose the specific resources implementing the TGW (e.g., nodes of a packet processing service of the cloud provider network) such that the TGW resources lie in the same availability zone of the provider network as the SDAs with which communication sessions are established by the TGW. As such, traffic between the SDAs and the TGW may not cross availability zone boundaries in such embodiments.

In at least some embodiments, the client on whose behalf a MALC is established may wish to segment the traffic that is processed using the TGW and/or its connected SDAs, e.g., so that different groups of packet flows are treated or processed differently. For example, packets transmitted to or from a set of computing devices of a software development department or workgroup of the client's organization may be processed differently (e.g., analyzed for security purposes using a different approach, and/or sent to a first set of compute instances) than packets transmitted to or from a set of computing devices of a finance department or workgroup. The packets associated with the software development department may be considered part of a different network segment than the packets associated with the finance department. In some embodiments, to enable such differentiation among packet flows, a client may submit one or more programmatic requests to request multi-segment support for traffic flowing over the MALC or its underlying transport attachment, and to define a collection of network segments. In one embodiment, a TGW may maintain multiple routing domains, e.g., with one or more route tables of a given routing domain being used for routing traffic of a particular network segment. In some embodiments, at least a portion of the routing information provided by a SDA to a TGW may include annotations or metadata indicating a particular network segment to which the routing information applies, and the TGW may propagate that portion of the routing information to a corresponding route table. In at least one embodiment, logic implemented at the SDAs may insert or apply segment-specific annotations to packets that are initially received at the SDAs without such annotations, and send the annotated packets to a TGW. In some embodiments, packet processing rules specified by clients on whose behalf TGWs are set up may be used by the TGWs to annotate packets with segment-specific annotations before sending the packets on to SDAs for further processing.

In various embodiments in which a client wishes to define network segments, at least some data packets flowing to or from compute instances of the client may be annotated with segment information, and entries from a corresponding segment-specific route table may be utilized to route such packets. In some embodiments, BGP Route Distinguishers selected by the client may be used to specify network segments when transmitting routing information. In at least one embodiment in which an extensible encapsulation protocol such as Geneve is used, network segment information may be transmitted by annotating one or more of the protocol's header options or header fields. Annotations or metadata included with or in a data packet may be used in various embodiments by the TGW to identify the network segment to which the data packet belongs, and then to route the data packet based at least in part on its network segment.

In various embodiments, as indicated above, TGWs, MALCs and/or SDAs may be created using resources of a cloud provider network or cloud computing environment, such as (but not limited to) compute instances or virtual machines of a virtualized computing service or VCS. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, packet processing services, state management services and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a wide-area network comprising virtual private clouds including software-defined appliances in multiple regions of a cloud computing environment may be configured using transit gateways, according to at least some embodiments. In system 100, resources of a cloud provider network may be distributed among data centers in several cloud provider network regions (CPNRs) such as CPNR 105A in a country C1, CPNR 105B in country C2, CPNR 105C in state S1 of country C3, and CPNR 105D in states S2 and S3 of country C3. The data centers of a particular CPNR may be located relatively close to each other, but data centers of one CPNR may in at least some cases be relatively distant from data centers of another CPNR. The boundaries of CPNRs may not necessarily coincide with those of countries or other political/civil entities in at least some embodiments: e.g., multiple CPNRs may be set up within a single large country, or even within a single large state or city. In various embodiments, the resources of the provider network may also be organized into availability zones (AZs), and various types of applications or services may be implemented using resources spread over several availability containers to improve overall availability levels.

Some clients of provider networks may perform business activities in, or have employees and offices in, a variety of locations, e.g., in different countries or continents. For example, a multi-national firm may have offices in various locations in North America, Asia, Europe, Africa, and so on. For some types of tasks, such entities may wish to utilize the capabilities of provider networks in a location-independent manner—e.g., a firm may wish to have some computation tasks performed in Europe (where one set of the firm's employees and computing resources may be located), and results of the computation tasks be seamlessly transferred to North America (where another set of employees of the firm may be located at one or more offices). In some embodiments, regional transit gateways (TGWs) may be established, for example using nodes of a packet processing service of the cloud provider network, and linked to one another to form a cloud-based wide area network (WAN) help fulfill such requirements. For example, external isolated networks (located at customer data centers, offices and the like) that are located close to data centers of one CPNR (e.g., CPNR 105A) may be attached to a region-level TGW 125A of that CPNR. The TGW 125A may be linked using managed inter-region fabric 150 to another region-level TGW 125B at a different CPNR, CPNR 105B, near to where another external network (or isolated virtual network) of the same client may be located, enabling traffic to flow in a scalable fashion on behalf of clients among various geographical locations.

A number of isolated networks, such as virtual private clouds (VPCs) within the cloud provider network as well as external isolated networks at client premises may be programmatically attached to individual ones of the regional TGWs 125 in the depicted embodiments, e.g., by cloud provider networks configuration managers (CMs) 110 in response to programmatic requests from clients of the provider network. For example, a respective transport attachment may be created between VPC 120A and TGW 125A, VPC 120B and TGW 125B, VPC 120C and TGW 125C, VPC 120D and TGW 125D, and VPC 120E and TGW 125D. In addition, transport attachments may also be established between external isolated network 122A and TGW 125A, external isolated network 122B and TGW 125B, and external isolated network 122C and TGW 125D.

In the embodiment depicted in FIG. 1, some VPCs may comprise compute instances or virtual machines that are used primarily to run customer applications, while other VPCs may be used to host software-defined appliances (SDAs) or virtual appliances chosen by (and at least in some cases configured by) clients of the cloud provider network. For example, VPC 120D may be used primarily for running client applications, and may therefore be referred to as an application compute instance (ACI) VPC, while VPC 120E may be used primarily for SDAs and may therefore be referred to as an SDA VPC. Note that at least in some embodiments, both application compute instances and SDAs may be run in the same VPC. In various embodiments, a given SDA may comprise one or more software processes or threads run (e.g., within a software container) on a compute instance; as such, compute instances may be used to run customer applications as well as SDAs. SDAs may comprise logic to perform a variety of packet processing related tasks (network functions) in different embodiments, such as to exchange routing information with TGWs that can be used to route traffic to or from various VPCs and external isolated networks, to perform security-related computations such as packet inspections, to generate logs of network traffic, and so on. In at least one embodiment, numerous SDAs may be dynamically created/established at a given VPC by a client, e.g., as the traffic level of the client's resources at other VPCs and/or external isolated networks increases or as the client decides that new network functions are required for the client's traffic. In the depicted embodiment individual ones of the SDAs configured in VPC 120E may comprise a respective Border Gateway Protocol (BGP) engine or daemon for communications with TGW 125D. In other embodiments, at least some SDAs and TGW may communicate via protocols other than BGP.

In the embodiment shown in FIG. 1, a client may submit respective programmatic requests to a CM 110 for transport attachment to be established between TGW 125D and VPC 120E, and between TGW 125D and VPC 120D. After a transport attachment is set up between TGW 125D and an SDA VPC 120E, the CM may (e.g., in response to one or more additional programmatic requests) create a multi-appliance logical connection (MALC) for communication between TGW 125D and a group of network addresses of the SDA VPC 120E. Individual addresses of the group of network addresses may be assigned to respective SDAs by the client (SDAs that have already been created or launched by the client at the time of the establishment of the MALC, and/or SDAs that are created or launched in the future) in various embodiments. Traffic sent via the MALC in either direction (to the TGW from an SDA, or to an SDA from the TGW) may be transmitted via the pre-existing transport attachment between VPC 120E and TGW 125D in the depicted embodiment.

In various embodiments, a CM 110 may cause, subsequent to assignment of an address of the address group to an SDA, a BGP session (or a session of some other routing information exchange protocol selected by the client and supported by the TGW) to be established automatically between the SDA and the TGW, without requiring additional configuration operations to be performed by the client. In at least some implementations, as part of automating the establishment of BGP sessions, networking infrastructure components of the cloud provider network may listen for BGP messages originating at individual ones of the addresses of the address group, and transmit them to an address that is assigned to the TGW. In at least one embodiment, a second group of addresses for BGP communications may be assigned to the TGW, and one address of the second group may be chosen for a given BGP session. As additional SDAs are brought online and assigned addresses of the address group associated with the MALC, additional BGP sessions may thus be created. The BGP sessions may be used, at least in part, by the SDAs to convey route advertisements/updates (e.g., pertaining to client resources in external isolated networks) to the TGW, and to receive route advertisements/updates (e.g., pertaining to client resources within VPCs) from the TGW in various embodiments. Using routing information received via the BGP session(s), the TGW may route data packets (e.g., data packets being sent to or from application compute instances in VPC 120D) appropriately in various embodiments, e.g., to next-hop targets indicated in the routing information. In at least some embodiments, the next-hop targets may comprise the SDAs themselves. In one example scenario, the routing information provided by an SDA SDA-1 in VPC 120E to TGW 125D may cause the TGW 125D to route a packet flow originating at an application compute instance in VPC 120D, and with a destination address within external isolated network 122C, via SDA-1 itself. Note that although FIG. 1 shows a VPC 120E comprising SDAs in only one of the CPNRs, in at least some embodiments, SDAs may be configured by a client within VPCs in several CPNRs.

In some embodiments, various types of messages between TGWs and SDAs (e.g., including BGP messages comprising routing information) may be sent via encapsulation protocols such as GRE or Geneve. In at least one embodiment, clients may request multi-segment support for packets transmitted via an MALC (or more generally, for all their WAN traffic) and define a set of network segments using programmatic interfaces. In such embodiments, at least some of the messages sent between TGWs and SDAs over an MALC may comprise segment identifiers to enable different actions to be taken for packet flows of the respective segments—for example, data packets of one segment may be routed to a first group of application compute instances, while data packets of another segment may be routed to a different group of application compute instances. In one embodiment, for example, respective route tables may be maintained by a TGW for different segments, and segment identifiers in the messages comprising routing information sent from SDAs may be used to store entries in the respective route tables for those segments. In some embodiments, BGP Route Distinguishers may be used to specify segments, e.g., for messages sent during BGP sessions. In at least one embodiment in which an encapsulation protocol such as Geneve is used for messages between TGWs and SDAs, header options or fields of the encapsulation protocol may also or instead be used to specify the network segments to which various data packets and/or routing information messages belong.

A dynamically scalable managed inter-region fabric 150 may be used to enable packets to flow at desired levels of performance and availability between CPNRs in various embodiments. The links of the fabric may be provisioned and managed (e.g., by adding/acquiring new fiber optic or other types of physical links, upgrading or otherwise changing the links and/or devices used) by the provider network operator, e.g., without requiring input from clients of the provider network on whose behalf the fabric is being used.

Figure 2:
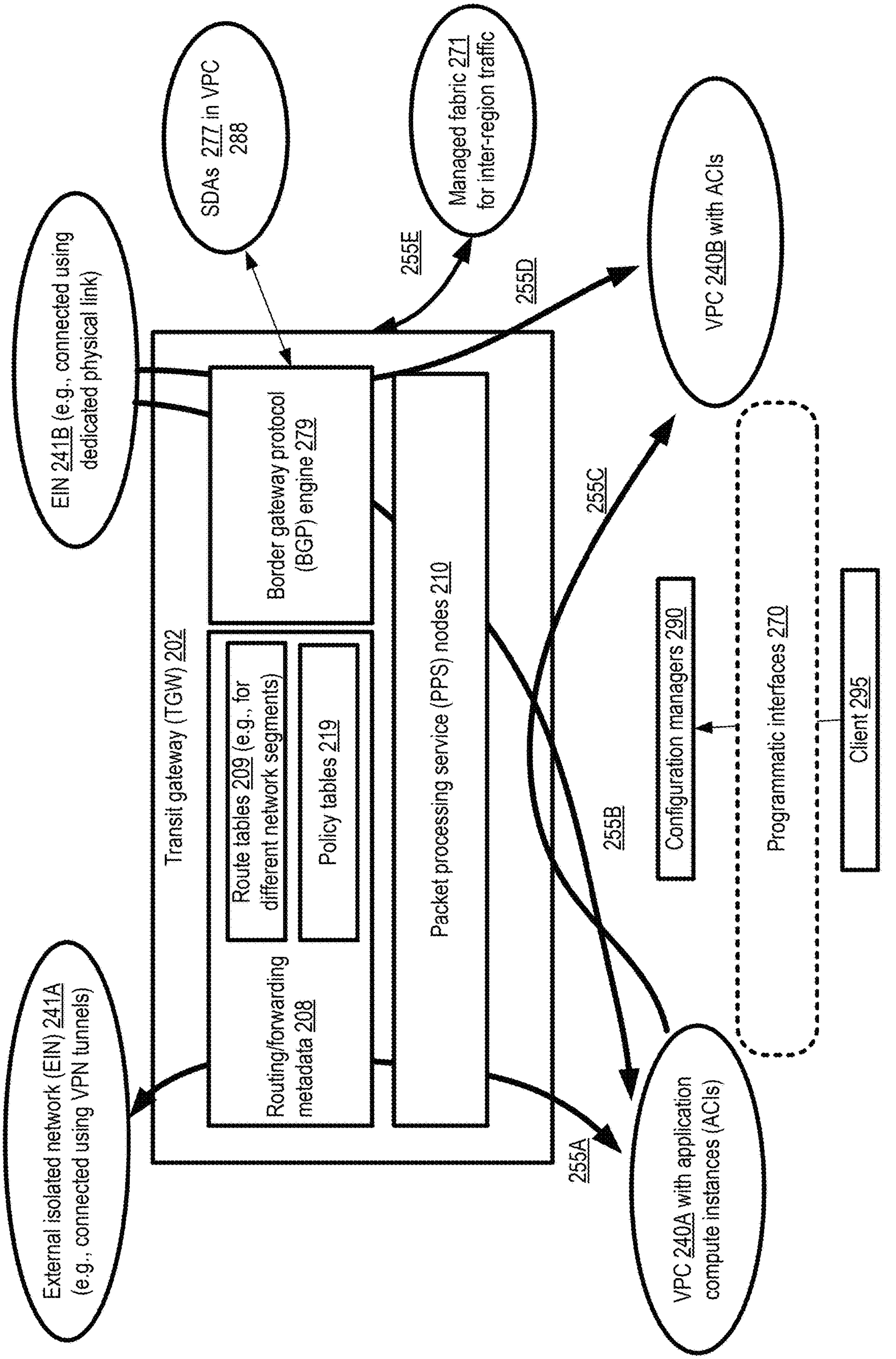
FIG. 2 illustrates example components of a transit gateway, according to at least some embodiments.

FIG. 2 illustrates example components of a transit gateway, according to at least some embodiments. In the depicted embodiment, transit gateway (TGW) 202 may comprise a collection of nodes of a packet processing service (PPS) of a cloud provider network. PPS nodes 210 may, for example, be distributed across multiple availability zones of a cloud provider network in some embodiments, enabling TGW 202 to continue functioning in the event of failures in any given availability zone. In some embodiments, the PPS may comprise at least two types of nodes: a set of fast-path nodes that cache and implement packet rewriting rules, and a set of exception-path nodes that generate the packet rewriting rules for new packet flows, maintain flow state information and the like. In such an embodiment, TGW 202 may comprise a dynamically scaled and highly available collection of both categories of PPS nodes, with new nodes being added or removed as the workload level changes. In various embodiments, a TGW may be created in response to programmatic requests sent by clients 295 to configuration managers 290 via a set of programmatic interfaces 270 of a virtualized computing service (VCS) of a cloud provider network. Programmatic interfaces 270 may include, for example, web-based consoles, command-line tools, application programming interfaces (APIs), graphical user interfaces (GUIs) and the like. The VCS programmatic interfaces 270 may also be used by clients to establish VPCs, launch compute instances within the VPCs, enable connectivity via transport attachments between TGWs and VPCs, and so on in different embodiments.

In the scenario depicted in FIG. 2, TGW 202 may be used for transmitting traffic among numerous isolated networks using routing/forwarding metadata 208. The isolated networks may include VPC 240A, VPC 240B, external isolated network (EIN) 241A and EIN 241B within a cloud provider network region in which the TGW 202 is configured, as well as other isolated networks in other regions to which traffic 255E can be transported via managed fabric 271 of the cloud provider network. EIN 241A may be connected to the cloud provider network and TGW 202 using Virtual Private Network (VPN) tunnels, while EIN 241B may be connected to the cloud provider network and TGW 202 via a dedicated physical link referred to as Direct Connect.

The packet processing/rewriting rules implemented by the TGW PPS nodes 210 may permit data packets to be sent only in client-specified directions between various isolated networks in the depicted embodiment. For example, traffic 255A may flow in either direction between EIN 241A and VPC 240A, traffic 255B may flow only from EIN 241B to VPC 240, traffic 255C may flow only from VPC 240A to VPC 240B, and traffic 255D may flow only from EIN 241B to VPC 240B. The client at whose request TGW 202 is set up may define a set of network segments into which various packet flows can be classified in some embodiments. In at least one embodiment, routing/forwarding metadata 208 may comprise multiple route tables 209 (e.g., one or more route tables per network segment), as well as one or more policy tables 219 for implementing policy-based routing. In some embodiments, the TGW 202 may comprise a BGP engine 279 with which BGP sessions may be automatically established by SDAs 277 running in one or more of the VPCs of the client such as VPC 288. The BGP sessions may utilize a multi-appliance logical connection established at client request between the TGW 202 and the SDA VPC 288 in some embodiments.

Figure 3:
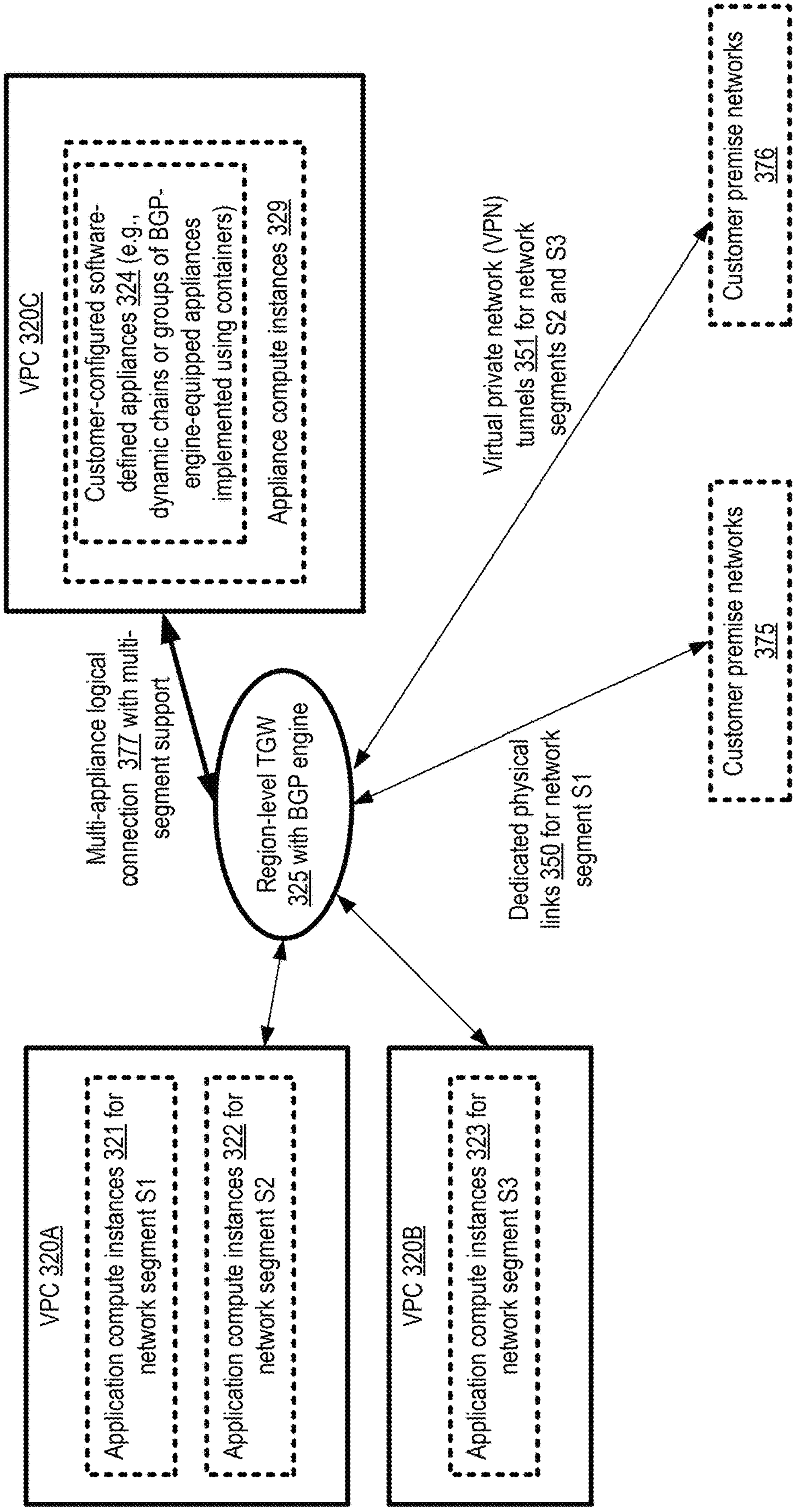
FIG. 3 illustrates example virtual private clouds and external networks which may be connected using a transit gateway, according to at least some embodiments.

FIG. 3 illustrates example virtual private clouds and external networks which may be connected using a transit gateway, according to at least some embodiments. In the depicted embodiment, a region-level TGW 325 of the cloud provider network may comprise a BGP engine. VPC 320A of a cloud client may comprise application compute instances 321 at which data processing tasks associated with a network segment S1 defined by the client may be performed, as well as application compute instances 322 at which data processing tasks associated with a network segment S2 defined by the client may be performed. VPC 320B of the client may comprise application compute instances 323 at which data processing tasks associated with a network segment S3 defined by the client may be performed.

VPC 320C may comprise a set of appliance compute instances 329 in the depicted embodiment. The appliance compute instances may comprise a dynamically changing set of customer-configured software-defined appliances 324. The SDAs may, for example comprise chains or groups of BGP-engine-equipped appliances implemented using software containers, with the number of appliances changing over time based on changing workload levels or changing network function requirements of the client. In response to one or more programmatic requests from the client, a multi-appliance logical connection 377 with multi-segment support may be established between the TGW 325 and the VPC 320C in the depicted embodiment. Using a single logical connection, multiple BGP sessions may be set up automatically between the TGW and individual ones of the SDAs in the depicted embodiment, without requiring different connections for individual sessions or different connections for conveying messages pertaining to different network segments.

The client may define network segments based on a variety of criteria in different embodiments. For example, in the scenario depicted in FIG. 3, traffic between customer premise networks 375 and application compute instances 321, transmitted via one or more dedicated physical links 350 (direct connect links) may be defined as part of network segment S1 traffic. Similarly, traffic between customer premise networks 376 and application compute instances 322, sent via one or more VPN tunnels 351, may be designated as segment S2 traffic, while traffic between customer premise networks 376 and application compute instances 323 may be designated as segment S3 traffic.

Figure 4:
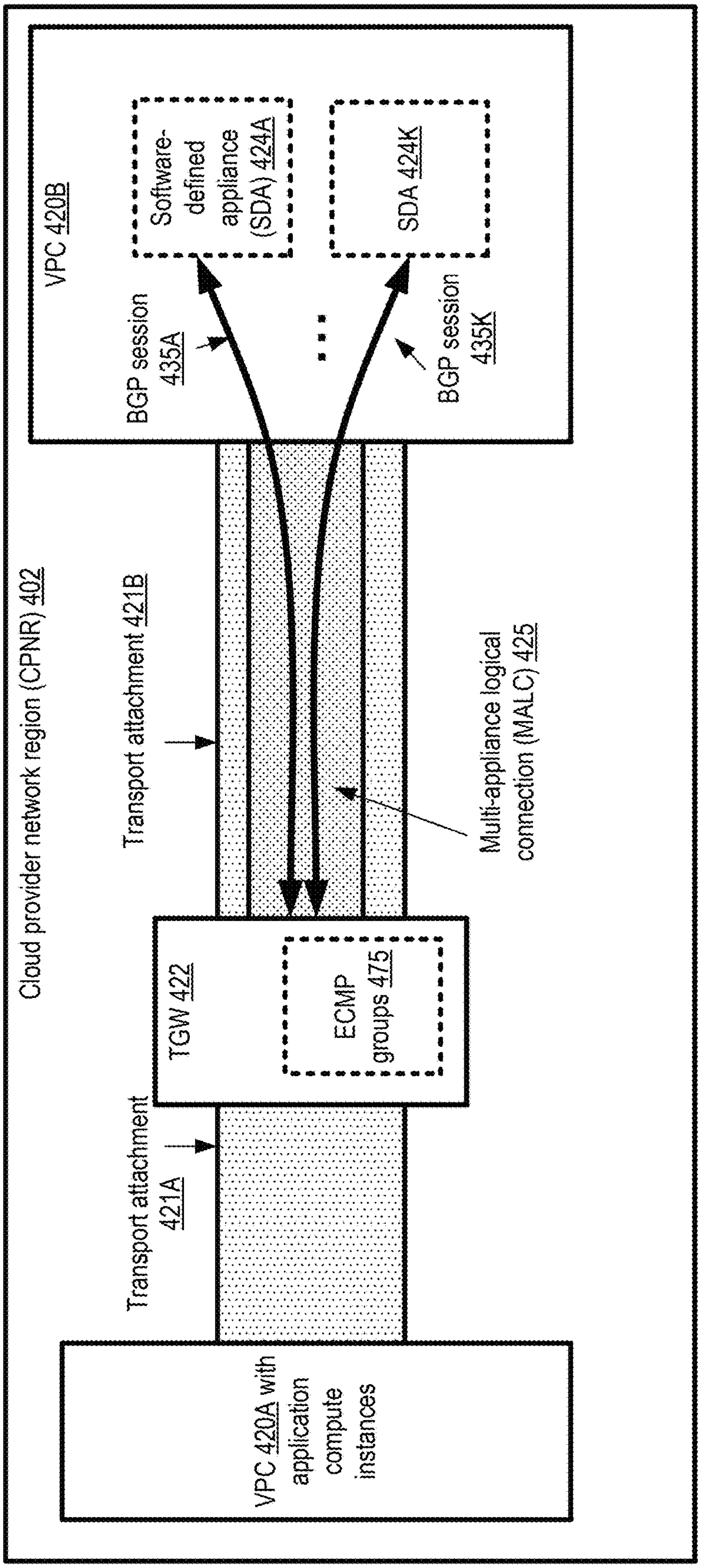
FIG. 4 illustrates an example multi-appliance logical connection which uses a transport attachment between a transit gateway and a virtual private cloud, according to at least some embodiments.

FIG. 4 illustrates an example multi-appliance logical connection which uses a transport attachment between a transit gateway and a virtual private cloud, according to at least some embodiments. In the embodiment shown in FIG. 4, two VPCs have been set up in a cloud provider network region (CPNR) 402 on behalf of a client. VPC 420A comprises application compute instances of the customer, whose traffic is to be sent to (and received from) other VPCs and/or external isolated networks within or outside CPNR 402 via TGW 422.

VPC 420B comprises a group of software-defined appliances (SDAs) configured by the client, such as SDA 424A or SDA 424K. The SDAs may be configured to use BGP sessions to communicate with a BGP engine of the cloud provider network, e.g., to provide routing information pertaining to resources in external isolated networks and/or to obtain routing information for resources in VPCs of the client.

In the depicted embodiment, the client may use programmatic interfaces of the cloud provider network to request transport attachments between the TGW 422 and one or more VPCs including VPC 420A and VPC 420B. In response to such programmatic requests, a configuration manager of the cloud provider network may establish transport attachment 421A (for messages between VPC 420A and TGW 422) and transport attachment 421B (for messages between VPC 420B and TGW 422). For a given transport attachment, the configuration manager may generate an attachment identifier which can be specified as a target in one or more route tables in some embodiments. Similar transport attachments may be created for connectivity between TGW and external isolated networks via VPN tunnels and/or Direct Connect dedicated physical links in some embodiments. In at least one embodiment, the attachment identifier target in route table entries may in effect be translated by networking infrastructure of the cloud provider network into addresses of packet processing nodes which form the TGW, so that a packet which is intended to be sent to a resource within VPC 420A is sent via the TGW node.

In response to one or more additional programmatic requests from the client, a multi-appliance logical connection (MALC) 425 may be created or configured and associated with transport attachment 421B in the depicted embodiment. For example, in a programmatic request to create the MALC, the identifier of transport attachment 421B may be provided as a parameter indicating the underlying transport mechanism which is to be used. In various embodiments, a group of network addresses which can be assigned to SDAs 424 that are to communicate via the MALC with TGW 422 may also be specified as a parameter of the request to establish the MALC. In some embodiments, the SDA address group may be indicated via a CIDR block. In other embodiments, a subnet identifier may be used to specify the group of addresses set aside for potential use by SDAs. In one embodiment, SDA IP addresses may be specified as a list, instead of using a CIDR block or a subnet identifier. Configuration information of the TGW, such as a collection of TGW addresses that are to be used for establishing BGP sessions with SDAs of VPC 420B, may be propagated to the VPC 420B by the configuration manager in at least some embodiments.

After the MALC has been set up, in various embodiments it can be utilized for traffic of multiple BGP sessions without, for example, requiring the client to create additional connections between the TGW and SDAs. For example, after SDA 424A is assigned a network address from the group specified during creation of the MALC, BGP session 435A may be established with a BGP engine of the TGW 422. Similarly, after SDA 424K is assigned a network address of the group, BGP session 435K may be set up, and so on.

In at least some embodiments, multiple SDAs 424 may be set up for sharing workloads of a particular type of packet processing. In one such embodiment, if for example SDA-1, SDA-2 and SDA-3 all inform the TGW, via respective BGP sessions using MALC 425, that each of them (the SDAs) are to be used as the next-hop target for a particular segment of network traffic, the TGW 422 may include all three SDAs in an equal cost multi-path (ECMP) group 475. The TGW may subsequently distribute the traffic of that network segment among the SDAs of the ECMP group.

Figure 5:
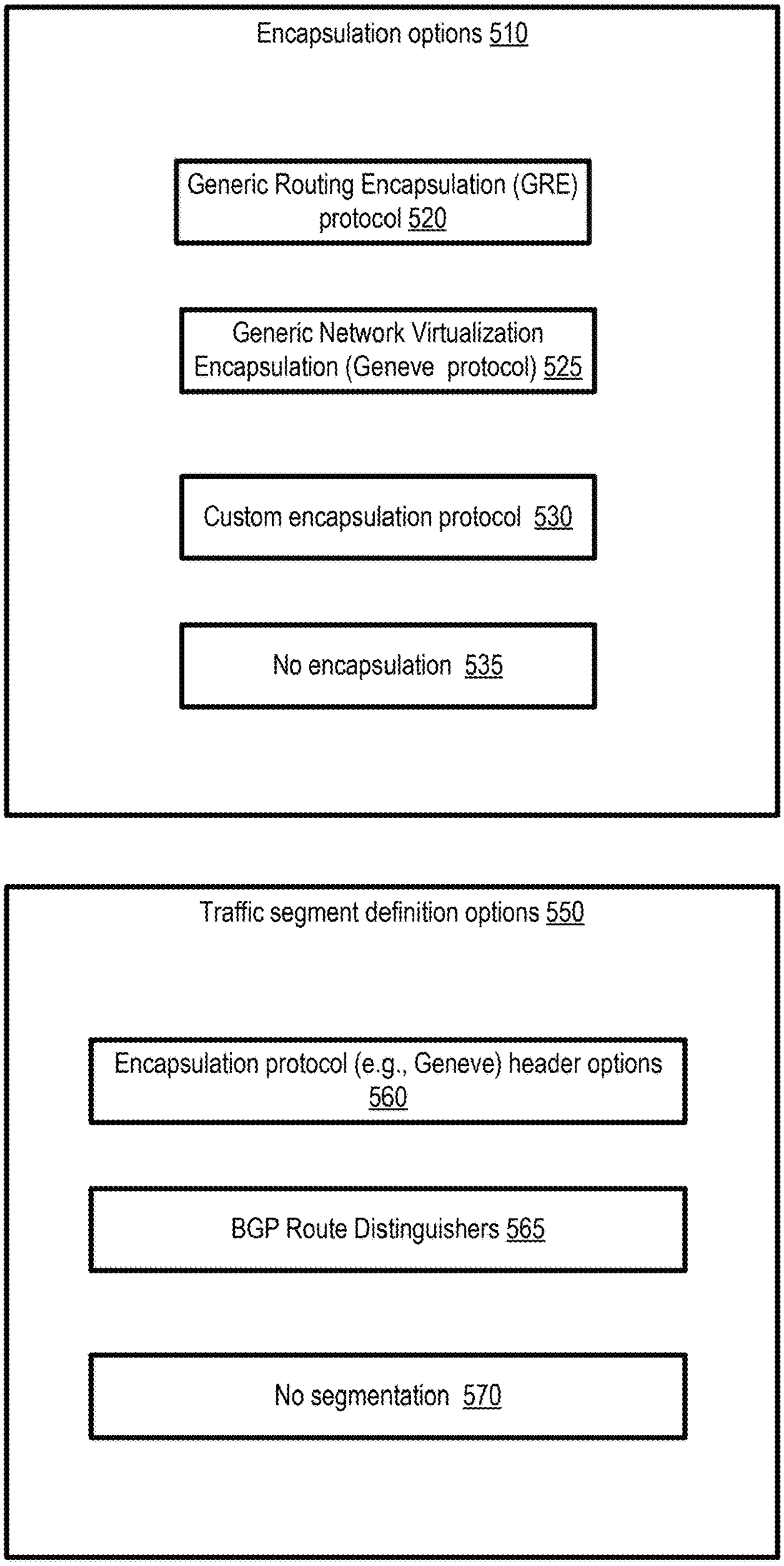
FIG. 5 illustrates example encapsulation options and example traffic segmentation options with respect to packets transmitted using a multi-appliance logical connection, according to at least some embodiments.

FIG. 5 illustrates example encapsulation options and example traffic segmentation options with respect to packets transmitted using a multi-appliance logical connection, according to at least some embodiments. Encapsulation options 510 for traffic that may be sent over MALCs of the kind introduced above may comprise the Generic Routing Encapsulation (GRE) protocol 520, Generic Network Virtualization Encapsulation (Geneve) protocol 525, a custom encapsulation protocol 530 supported by a client's SDAs and by the provider network's TGWs, or no encapsulation 535 in the depicted embodiment. In at least one embodiment, for example, an SDA may comprise third party software (software developed by an entity other than the provider network operator and the client on whose behalf a TGW is established) which utilizes a proprietary encapsulation protocol of the third party, and TGW software may be adapted such that the proprietary encapsulation protocol can be used. The no encapsulation option may also be referred to as tunnel less connectivity (TLC) between TGWs and SDAs.

As mentioned earlier, in various embodiments a client of a provider network may wish to define several network segments of the traffic sent to or from resources of the client. Such a client may request that multi-segment support be enabled using programmatic requests, e.g., in the same programmatic request which is used to create an MALC, or in a separate request. A number of traffic segment definition options 550 may be supported, at least some of which may be used in combination in some embodiments. In embodiments in which an encapsulation protocol such as Geneve is being used to communicate with a TGW, and the protocol headers support custom options, such encapsulation protocol header options 560 may be used to specify the network segment with which a packet is associated. In some embodiments, with respect to segment-specific routing information, BGP Route Distinguishers 565 may be used to indicate the segment with which the routing information is associated. In at least some embodiments, the option of no segmentation 570 may be provided as well. For example, a client that does not wish to define network segments may simply not request multi-segment support.

Figure 6:
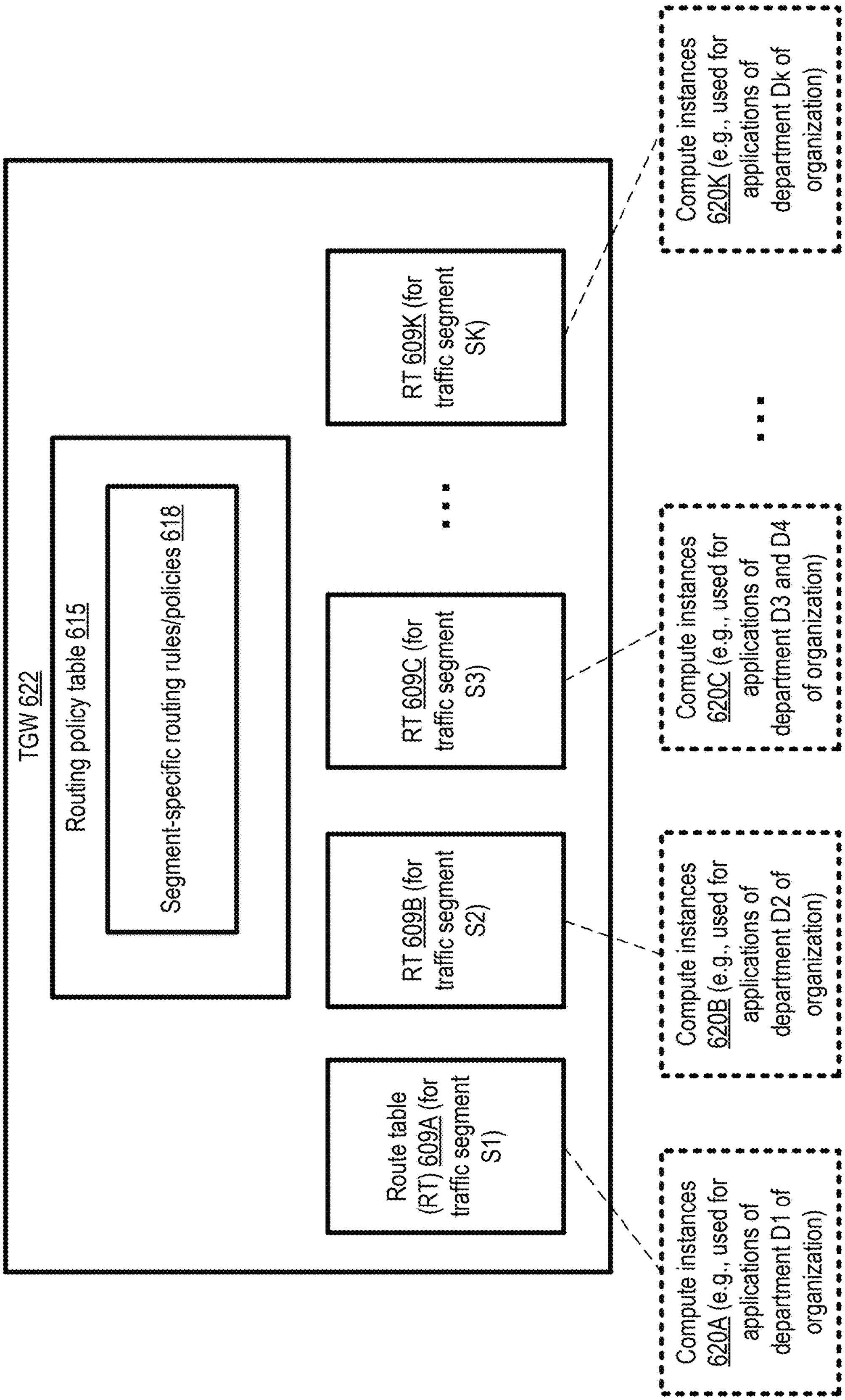
FIG. 6 illustrates an example scenario in which policy-based routing may be implemented at a transit gateway which comprises multiple segment-specific route tables, according to at least some embodiments.

FIG. 6 illustrates an example scenario in which policy-based routing may be implemented at a transit gateway which comprises multiple segment-specific route tables, according to at least some embodiments. In the embodiment depicted in FIG. 6, a TGW 622 may comprise or use a number of route tables (RTs) 609, such as RT 609A, RT 609B, RT 609C or RT 609K. In some embodiments, there may be a 1:1 mapping between network segments defined by the client at whose request the TGW is created, and individual RTs. For example, RT 609A may be used to store entries for routing packet flows of segment S1 to/from compute instances 620A, with segment S1 comprising packets associated with applications used by department D1 of the client's business organization. Similarly, RT 609B may be used to store entries for routing packet flows of segment S2 to/from compute instances 620B at which applications associated with department D2 of the organization are run, RT 609C may be used for entries of segment S3 (applications of departments D3 and D4, run at compute instances 620C), and RT 609K may be used for entries of segment Sk (applications of department Dk, run at compute instances 620K).

As and when the TGW receives segment-specific routing updates or route advertisements (e.g., via BGP sessions established, using an MALC, with one or more SDAs), the routing information may be propagated by the TGW to the appropriate RT for the segment. In at least one embodiment, a routing policy table 615 may be maintained at or by the TGW, comprising segment-specific routing rules or policies. Such rules or policies may, for example, comprise guidelines for routing traffic based on properties other than just the destination addresses of the packets (e.g., properties such as source addresses, ports etc.) in some embodiments. Individual ones of the routing rules or policies of table 615 may be associated with respective RTs in some embodiments.

Figure 7:
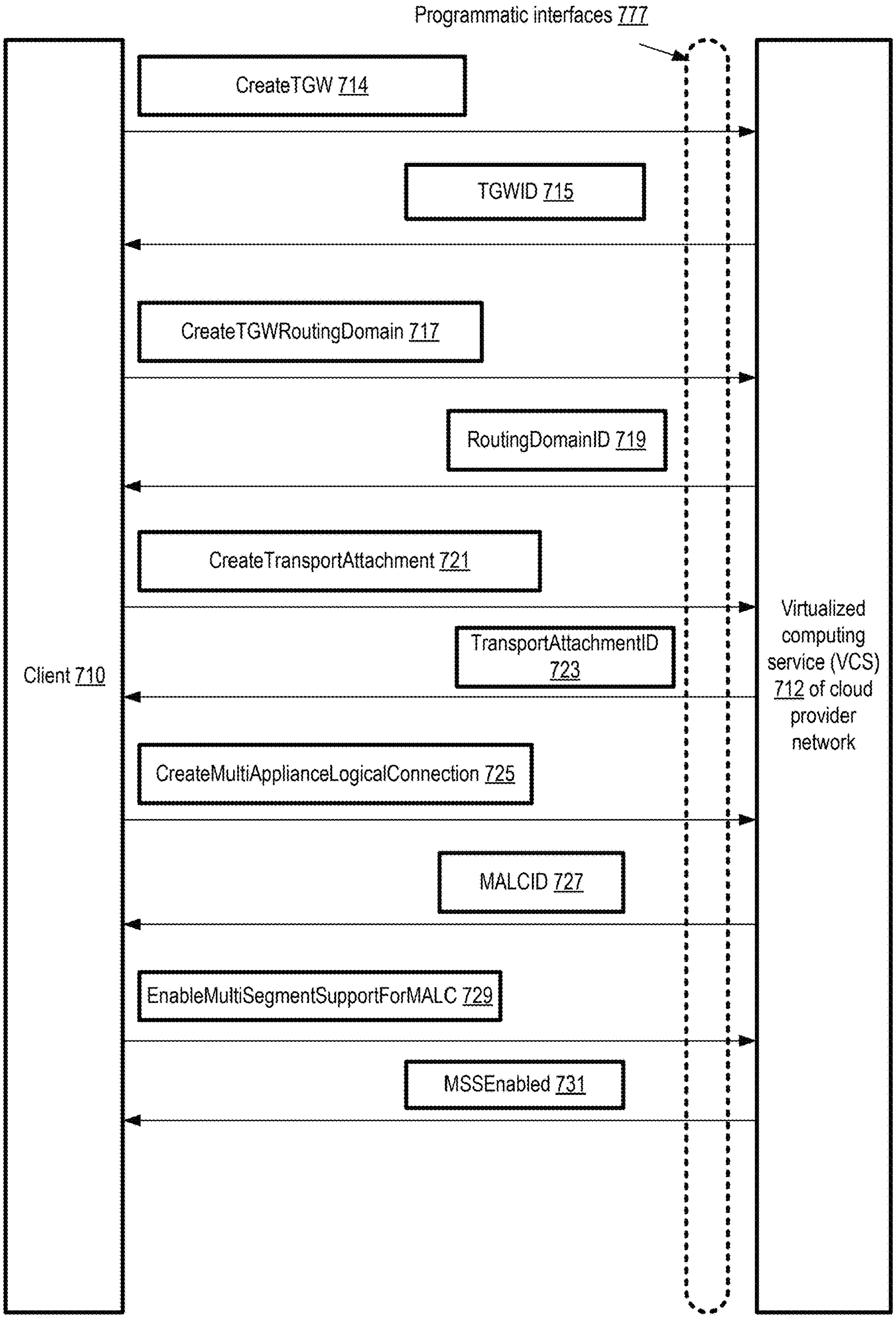
FIG. 7 and FIG. 8 collectively illustrate example programmatic interactions between clients and a virtualized computing service, pertaining to the use of transit gateways and multi-appliance logical connections, according to at least some embodiments.
Figure 8:
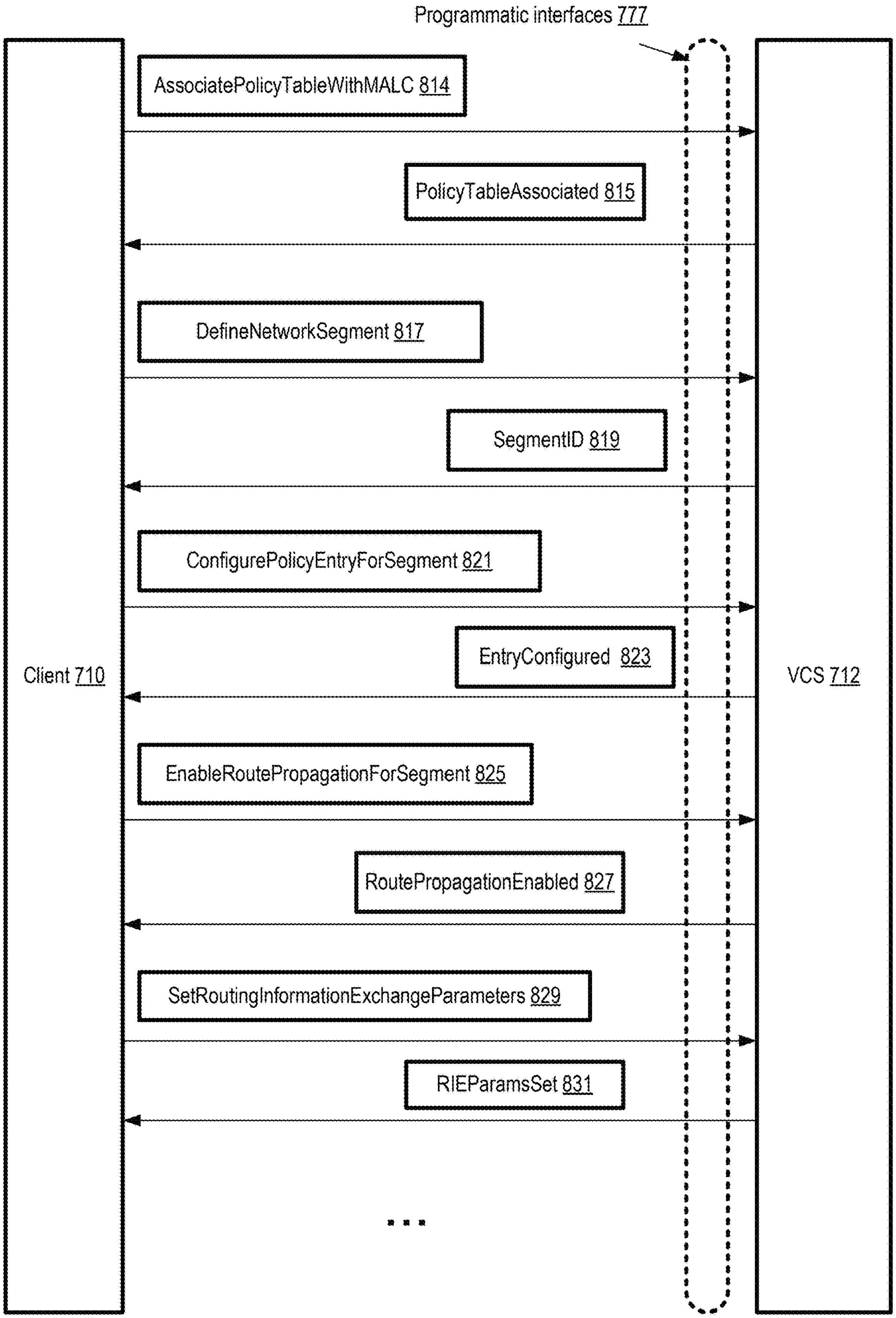

In at least some embodiments, clients of a cloud provider network may interact with control plane components or configuration managers of a virtualized computing service (VCS) of the provider network to set up multi-appliance logical connections. FIG. 7 and FIG. 8 collectively illustrate example programmatic interactions between clients and a virtualized computing service, pertaining to the use of transit gateways and multi-appliance logical connections, according to at least some embodiments. VCS 712 may implement a variety of programmatic interfaces 777 in the depicted embodiment, such as web-based consoles, command-line tools, application programming interfaces (APIs), graphical user interfaces and the like, which may be used by customers or clients 710 (e.g., administrators of VPCs) to submit various types of programmatic requests related to connectivity with virtual appliances, and receive corresponding responses.

A client 710 may submit a CreateTGW request 714 in some embodiments to request the establishment of a transit gateway for traffic which is to flow among the client's isolated networks, such as VPCs that comprise application compute instances, VPCs that comprise software-defined appliances (SDAs) or virtual appliances, external isolated networks at client-owned premises, and the like. In some embodiments, a parameter of the CreateTGW request may indicate that a BGP engine or daemon is to be launched at the TGW for communication with the client's SDAs. In other embodiments, a BGP engine may be created by default as part of the TGW, so such a parameter may not be required. A TGW may be created at the VCS, and a corresponding TGW identifier TGWID 715 may be sent to the client.

In at least one embodiment, a given TGW may be used to transmit traffic of several routing domains with respective sets of one or more route tables. A CreateTGWRoutingDomain request 717 may be submitted by client 710 to request that a new routing domain be created. In at least one embodiment, there may be a 1:1 relationship between a routing domain and a route table, so the creation of a routing domain at the TGW may imply the creation and storage of a new route table in the TGW's metadata. A RoutingDomainID response 719 may be transmitted by the VCS to the client in some embodiments. In one embodiment, a new route table with one or more entries may be passed as a parameter of the CreateTGWRoutingDomain request 717. In some embodiments, a CreateRouteTable request (not shown in FIG. 7) may be submitted by a client, e.g., instead of a CreateTGWRoutingDomain request, to indicate that a new route table is to be included in the metadata of a specified TGW.

A client may submit a CreateTransportAttachment request 721 to programmatically attach a specified isolated network (e.g., a VPC within the provider network, a VPN-connected network outside the provider network's data centers, or an external network connected to the provider network via a dedicated physical link) to a specified TGW in some embodiments, and receive an attachment identifier TransportAttachmentID 723 in response. The establishment of the transport attachment may be a prerequisite for enabling traffic of various types to flow to the specified TGW, including data packets, messages comprising dynamic routing updates sent over BGP sessions, and the like in different embodiments.

In various embodiments, after a transport attachment is created, a CreateMultiApplianceLogicalConnection request 725 may be sent by a client to request the establishment of an MALC of the kind introduced above between a specified TGW and a specified VPC within which SDAs of the client are expected to be assigned network addresses. The identifier of an underlying transport attachment over which the messages are to be sent between the TGW and the SDAs (e.g., via automatically established BGP sessions) may be specified as a parameter of the CreateMultiApplianceLogicalConnection request 725 in some embodiments. In at least one embodiment, the group of network addresses which are assigned to currently-configured SDAs of the client's VPC, and/or are going to be assigned to SDAs configured in that VPC in the future, may be specified as a parameter in the CreateMultiApplianceLogicalConnection request 725, e.g., as a CIDR block or an identifier of a subnet within the VPC. In some embodiments, a parameter of the CreateMultiApplianceLogicalConnection request 725 may comprise one or more network addresses of the TGW which is to be used for connectivity (e.g., via tunnels of an encapsulation protocol such as GRE or Geneve) with the SDAs. In one embodiment in which BGP is used for exchanging routing information between SDAs and the TGW, BGP-related parameters such as a Peer ASN (Autonomous System Number) and/or a CIDR block of TGW addresses to be utilized for individual BGP sessions may be included as parameters of the CreateMultiApplianceLogicalConnection request 725. In various embodiments a client may indicate (if an encapsulation protocol is to be used for the communications between the SDAs and the TGW) the specific encapsulation protocol (e.g., GRE or Geneve) which the client wishes to utilize.

In at least one embodiment in which the client wants to enable support for multi-segment support using a protocol such as Geneve, a parameter requesting such support may be included in the CreateMultiApplianceLogicalConnection request 725, e.g., along with the specific Geneve header options that are to be used for segment information. In other embodiments, a separate request for enabling multi-segment support may be sent by the client as indicated below. In at least one embodiment, an identifier of the newly created MALC, MALCID 727 may be sent to the client 710 in response to the CreateMultiApplianceLogicalConnection request 725. In at least some embodiments, operations performed at the VCS in response to a CreateMultiApplianceLogicalConnection request 725 may include storing metadata comprising properties of the newly created MALC (e.g., TGW addresses, SDA addresses, protocols, etc.) in a repository. In addition, the operations performed may include propagating information about the MALC properties to networking infrastructure components of the VCS (e.g., including nodes of the packet processing service being used to implement the TGW) to enable the networking infrastructure components to direct packets (e.g., packets comprising BGP session establishment requests from SDAs with addresses in the specified group of addresses) correctly.

In some embodiments, a client may submit an EnableMultiSegmentSupportForMALC request 729, specifying an existing MALC for which multi-segment support is to be enabled with regard to traffic associated with one or more isolated networks (including at least one VPC that comprises or will comprise one or kore SDAs). Request 729 may for example specify header options of an encapsulation protocol which are to be used for indicating segments (such as the options that TGWs should expect to encounter in headers of packets sent to them from SDAs, and the options that SDAs should expect to encounter in packets sent to the SDAs from TGWs), BGP Route Distinguisher parameters to be used for indicating the segment with which a set of routing updates are associated, and so on. In at least some embodiments, BGP Route Distinguishers may be utilized to specify relevant segments with respect to BGP control packets, while encapsulation packet header options may be used to specify relevant segments for data packets. Multi-segment support may be enabled, and an MSSEnabled message 731 may be sent to the client in some embodiments. Note that at least in one embodiment, multi-segment support (e.g., using Geneve header options and/or BGP Route Distinguishers) may be enabled for traffic of a TGW and one or more SDAs even if an MALC is not established for TGW-to-SDA and SDA-to- TGW communications. For example, in one scenario respective single-appliance logical connections (SALCs) may be configured for communication between a TGW and one or more SDAs in a VPC of a client, and segment-specific routing and/or packet processing may be performed with respect to packets sent over such SALCs. As such, the techniques of supporting multiple network segments (using encapsulation packet headers and/or BGP Route Distinguishers) and supporting multi-appliance logical connections may be considered orthogonal, with either feature being implementable independent of the other.

In various embodiments, policy-based routing may be implemented by a TGW. As indicated in FIG. 8, an AssociatePolicyTableWithMALC request 814 may be submitted by a client 710 via programmatic interfaces 777 to a configuration manager or control plane server of a VCS to specify a policy table whose entries indicate policies to be used for routing packets obtained via (or sent via) a specified MALC by a TGW. A PolicyTableAssociated response message 815 may be sent to the client in the depicted embodiment after metadata indicating the requested association is stored.

A client 710 may request the creation of a new network segment by submitting a DefineNetworkSegment request 817 in at least some embodiments. In one embodiment, the DefineNetworkSegment request may comprise parameters that specify a user-friendly name of the segment (e.g., "Department D1 traffic"), a BGP Route Distinguisher (such as "65000:10") for the new segment, and/or one or more encapsulation header options for the new segment (e.g., "GeneveOption={"Class": "<class ID>", "Type": "<Type ID>", "Value": "<ValueString>" or the equivalent). An identifier generated for the new segment, SegmentID 819, may be sent to client 710 in some embodiments after the parameters have been saved.

Respective routing policies may be defined for individual ones of the segments via one or more ConfigurePolicyEntryForSegment requests 821 in the depicted embodiment. The policies (which may indicate respective TGW routing domains or TGW route tables for the segments via parameters) may be stored (e.g., as entries in a TGW policy table of the kind mentioned above), and an EntryConfigured response message 823 may be sent to the client in at least one embodiment.

An EnableRoutePropagationForSegment request 825 may be sent by a client 710 in some embodiments to request automatic propagation of route updates/advertisements/announcements of a specified network segment by a specified TGW (which may receive the updates via automatically established BGP sessions) to a particular route table in some embodiments. A RoutePropagationEnabled response 827 may be sent to the client in at least one embodiment after the requested route propagation is activated.

In at least one embodiment, updated parameters to be used during routing information exchange sessions between a specified TGW and a group of one or more SDAs may be indicated by a client using a SetRoutingInformationExchangeParameters request 829. The parameters may, for example, specify the version of BGP, EBGP, MP-BGP or some other protocol which is to be used, BGP ASNs or their logical equivalents, BGP Route Distinguishers or their logical equivalents, IP addresses to be used for individual BGP sessions on the TGW side or the SDA side, and so on in different embodiments. An RIEParamsSet message 831 may be sent to the client to indicate that the updated parameters have been saved and will be used going forward. In at least some embodiments, programmatic interactions pertaining to connectivity between SDAs and TGWs other than those shown in FIG. 7 or FIG. 8, may be supported by a VCS.

Figure 9:
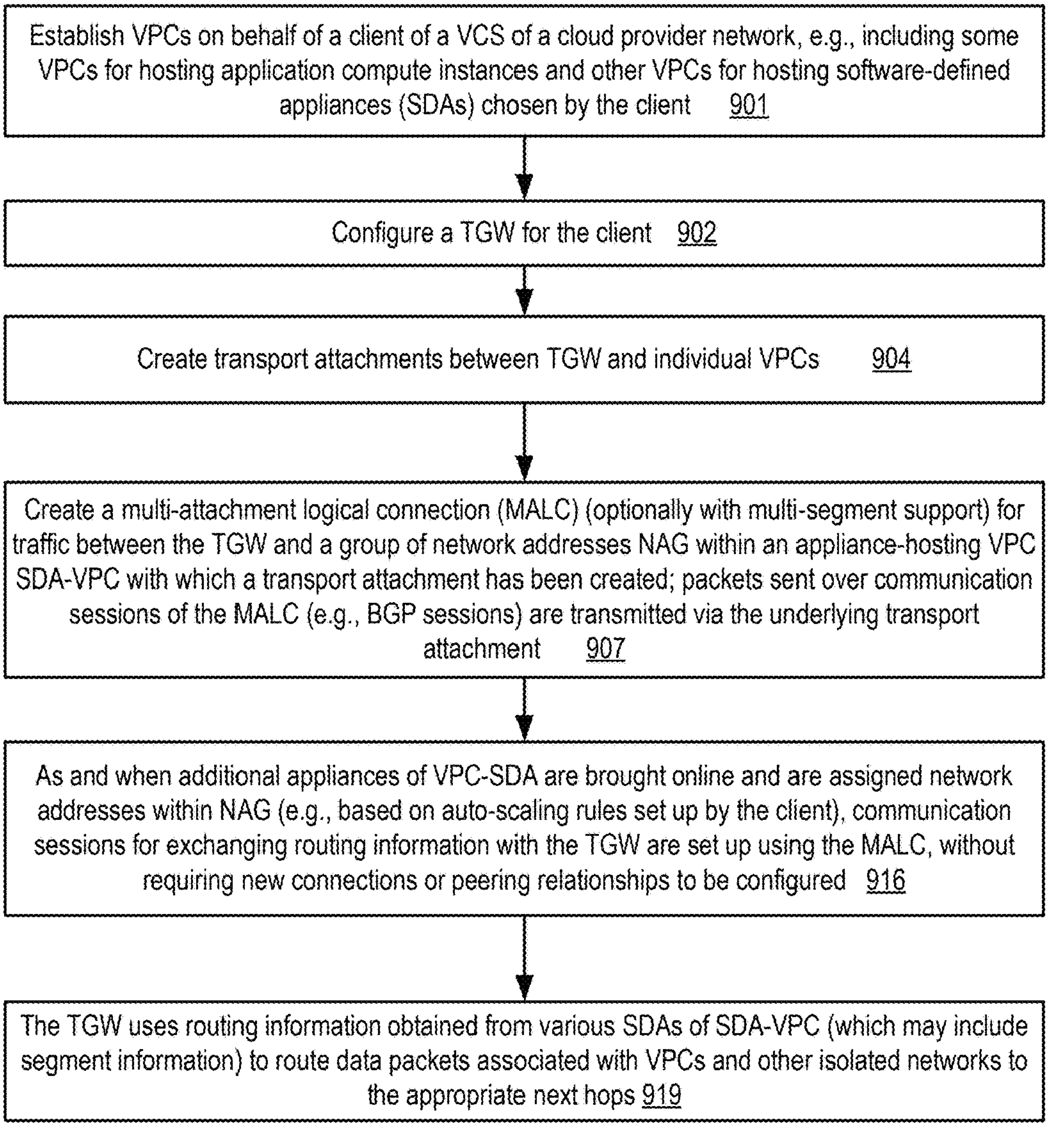
FIG. 9 is a flow diagram illustrating aspects of operations pertaining to configuration and use of multi-appliance logical connections at a cloud computing environment, according to at least some embodiments.

FIG. 9 is a flow diagram illustrating aspects of operations pertaining to configuration and use of multi-appliance logical connections at a cloud computing environment, according to at least some embodiments. As shown in element 901, a set of VPCs may be established on behalf of a client of a VCS of a cloud provider network in various embodiments, e.g., in response to programmatic requests obtained by configuration managers (CMs) of the VCS. Some of the VPCs may be used for hosting resources such as compute instances or virtual machines used for running applications of the client, while other VPCs may comprise at least some client-chosen software-defined appliances (SDAs) such as SD-WAN appliances, security appliances, logging appliances and the like. In at least one embodiment, one or more of the SDAs may be chosen by the client for compatibility with client-premise networks. For example, the client's organization may have one or more locations outside the cloud provider network, and a particular version of a BGP engine/daemon may be used for managing routing information of those locations, or a particular type of security check may be performed on packets exiting/entering those locations. In such a scenario, the client may wish to use the same version of BGP engine/daemon, and/or the same type of security checks, implemented by a software appliance, for managing traffic associated with the client's cloud-based resources in some embodiments.

In the depicted embodiment, one or more TGWs may be set up on behalf of the client (element 902), e.g., in response to one or more programmatic requests. The TGWs may be established for directing/distributing traffic among several isolated networks, including VPCs of the client and/or external-premise networks of the client. Respective transport attachments may be configured or established between a TGW and individual ones of the VPCs and/or external isolated networks of the client, e.g., by CMs of the VCS in response to additional programmatic requests in at least some embodiments (element 904).

In various embodiments, a CM may create a multi-attachment logical connection (MALC) between a TGW and a group of network addresses NAG within an SDA-hosting VPC (SDA-VPC) with which a transport attachment has already been created (element 907). Packets set over communication sessions that utilize the MALC may be transmitted via the underlying transport attachment in at least some embodiments. In some embodiments, the MALC may be configured to provide support for distinguishing among packets of different network segments. For example, the client may specify a class and/or type of Geneve headers to be used to specify segments, Route Distinguishers to be used, and so on.

In the embodiment depicted in FIG. 9, as and when additional SDAs of VPC-SDA are brought online and assigned network addresses of NAG, respective communication sessions for exchanging routing information (such as BGP sessions) may be set up automatically using the MALC (element 916), without requiring additional per-session configuration steps (such as configuring per-session connections or peering relationships) from the client. The routing information obtained by the TGW in respective sessions set up with different SDAs may be used by the TGW to route data packets to the appropriate next hops in various embodiments (element 919). For example, packets associated with a VPC hosting a first set of application compute instances of the client may be sent to a first next-hop resource indicated in routing information obtained from an SDA SDA-1 via the MALC in a first automatically established session, while packets associated with a VPC hosting a second set of application compute instances of the client may be sent to a second next-hop resource indicated in routing information obtained from an SDA SDA-2 via the MALC in a second automatically established session.

It is noted that in various embodiments, some of the operations shown in the flow diagram of FIG. 9 may be implemented in a different order than that shown in the figure, or may be performed in parallel rather than sequentially. Additionally, some of the operations shown in the flow diagram may not be required in one or more implementations.

Figure 10:
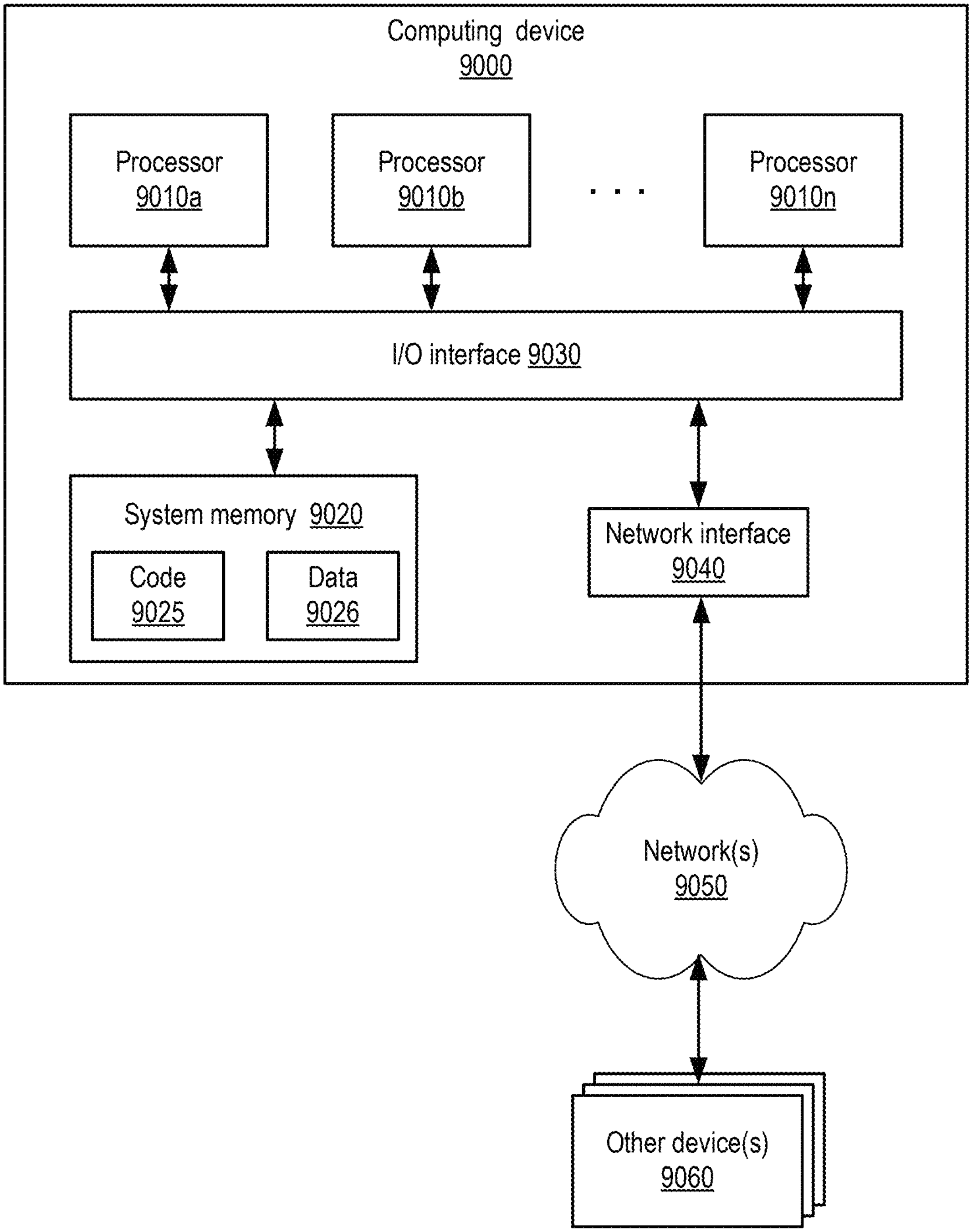
FIG. 10 is a block diagram illustrating an example computing device that may be used in at least some embodiments.

In at least some embodiments, a server that implements the types of techniques described herein (e.g., including the described functionality of configuration managers, TGWs, compute instances used for applications and/or SDAs, virtualization servers and the like), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:

creating a multi-appliance logical connection between a transit gateway (TGW) of a cloud computing environment and a group of network addresses of a first virtual private cloud (VPC) of a client of the cloud computing environment;

causing, subsequent to assignment of a first network address of the group to a first software-defined appliance of the first VPC, a first communication session of a routing information exchange protocol to be established, over the multi-appliance logical connection, between the TGW and the first software-defined appliance; and causing, subsequent to assignment of a second network address of the group to a second software-defined appliance of the first VPC, a second communication session of a routing information exchange protocol to be established, over the multi-appliance logical connection, between the TGW and the second software-defined appliance;

routing, by the TGW, based at least in part on first routing information received via the first communication session from the first software-defined appliance, a first data packet associated with a second VPC via a first next-hop target indicated in the first routing information; and routing, by the TGW, based at least in part on second routing information received via the second communication session from the second software-defined appliance, a second data packet associated with the second VPC via a second next-hop target indicated in the second routing information.

2. The computer-implemented method as recited in claim 1, wherein a message comprising at least a portion of the first routing information is transmitted from the first software-defined appliance to the TGW using an encapsulation protocol tunnel.

3. The computer-implemented method as recited in claim 2, wherein the encapsulation protocol comprises one of: (a) the Generic Routing Encapsulation (GRE) protocol or (b) the Generic Network Virtualization Encapsulation (Geneve) protocol.

4. The computer-implemented method as recited in claim 1, wherein the first routing information comprises an indication of a particular network segment of a plurality of client-defined network segments of traffic associated with the second VPC, the computer-implemented method further comprising:

propagating, at the TGW, based at least in part on the indication of the particular network segment, at least a portion of the first routing information to a particular route table selected from a set of route tables of the TGW.

5. The computer-implemented method as recited in claim 4, wherein the indication of the particular network segment comprises a Border Gateway Protocol (BGP) Route Distinguisher.

6. The computer-implemented method as recited in claim 4, further comprising:

receiving, from the client via a programmatic interface, a request for multi-segment support for packets transmitted over the multi-appliance logical connection; and causing, based at least in part on the request for multi-segment support, the TGW to propagate the portion of the first routing information to the particular route table.

7. The computer-implemented method as recited in claim 1, further comprising:

determining, at the TGW, based at least in part on an annotation of the first data packet, that the first data packet belongs to a particular network segment of a plurality of client-defined network segments of traffic associated with the second VPC, wherein routing of the first data packet by the TGW is based at least in part of the particular network segment.

8. The computer-implemented method as recited in claim 7, wherein the annotation comprises a portion of a header of an encapsulation protocol used for transmission of the first data packet.

9. The computer-implemented method as recited in claim 1, further comprising:

receiving, via a programmatic interface at a configuration manager of the cloud computing environment, a request to create the multi-appliance logical connection, wherein the multi-appliance logical connection is created in response to the request, and wherein, in the request, the group of network addresses is indicated via one or more of: (a) an identifier of a subnet of the first VPC or (b) a Classless Inter-Domain Routing (CIDR) block.

10. The computer-implemented method as recited in claim 1, wherein the first software-defined appliance comprises one of: (a) a software-defined wide area network (SD-WAN) appliance, (b) a security inspection appliance, or (c) a logging appliance.

11. A system, comprising:

one or more non-transitory computer-accessible storage media storing program instructions to implement a configuration manager of a cloud computing environment;

a transit gateway (TGW) established at the cloud computing environment; and a set of virtual private clouds (VPCs) established at the cloud computing environment for a client, including (a) a first VPC comprising software-defined appliances of the client and (b) a second VPC comprising application compute instances of the client;

wherein the configuration manager is configured to:

create a multi-appliance logical connection for communication between the TGW and a group of network addresses of the first VPC, wherein packets of the multi-appliance logical connection are transmitted via a transport attachment established between the TGW and the first VPC;

cause, subsequent to assignment of a first network address of the group of network addresses to a first software-defined appliance of the first VPC, a first BGP session to be established, over the multi-appliance logical connection, between the TGW and the first software-defined appliance; and cause, subsequent to assignment of a second network address of the group to a second software-defined appliance of the first VPC, a second BGP session to be established, over the multi-appliance logical connection, between the TGW and the second software-defined appliance; and wherein the TGW is configured to:

route, based at least in part on first routing information received via the first BGP session from the first software-defined appliance, a first data packet associated with a first application compute instance of the second VPC via a first next-hop target indicated in the first routing information; and route, based at least in part on second routing information received via the second BGP session from the second software-defined appliance, a second data packet associated with a second application compute instance of the second VPC via a second next-hop target indicated in the second routing information.

12. The system as recited in claim 11, wherein the first BGP session uses a tunnel configured using one of: (a) the Generic Routing Encapsulation (GRE) protocol or (b) the Generic Network Virtualization Encapsulation (Geneve) protocol.

13. The system as recited in claim 11, wherein the first routing information comprises an indication of a particular network segment of a plurality of client-defined network segments of traffic associated with the second VPC, wherein the TGW is further configured to:

propagate at least a portion of the first routing information to a particular route table, wherein the particular route table is selected from a set of route tables of the TGW based at least in part on the particular network segment.

14. The system as recited in claim 1, wherein the configuration manager is further configured to:

receive, via a programmatic interface, a request to create the multi-appliance logical connection, wherein the multi-appliance logical connection is created in response to the request, and wherein, in the request, the group of network addresses is indicated via one or more of: (a) an identifier of a subnet of the first VPC or (b) a Classless Inter-Domain Routing (CIDR) block.

15. The system as recited in claim 1, wherein the first software-defined appliance comprises one of: (a) a software-defined wide area network (SD-WAN) appliance, (b) a security inspection appliance, or (c) a logging appliance.

16. A non-transitory computer-accessible storage medium storing program instructions that when executed on a processor:

create a multi-appliance logical connection between a transit gateway (TGW) of a cloud computing environment and a group of network addresses of a first virtual private cloud (VPC) of a client of the cloud computing environment;

cause, subsequent to assignment of a first network address of the group to a first software-defined appliance of the first VPC, a first communication session of a routing information exchange protocol to be established, over the multi-appliance logical connection, between the TGW and the first software-defined appliance; and cause, subsequent to assignment of a second network address of the group to a second software-defined appliance of the first VPC, a second communication session of a routing information exchange protocol to be established, over the multi-appliance logical connection, between the TGW and the second software-defined appliance;

route, by the TGW, based at least in part on first routing information received via the first communication session from the first software-defined appliance, a first data packet associated with a second VPC via a first next-hop target indicated in the first routing information; and route, by the TGW, based at least in part on second routing information received via the second communication session from the second software-defined appliance, a second data packet associated with the second VPC via a second next-hop target indicated in the second routing information.

17. The non-transitory computer-accessible storage medium as recited in claim 16, wherein the first routing information comprises an indication of a particular network segment of a plurality of client-defined network segments of traffic associated with the second VPC, the non-transitory computer-accessible storage medium storing further program instructions that when executed on the processor:

cause the TGW to propagate, based at least in part on the indication of the particular network segment, at least a portion of the first routing information to a particular route table selected from a set of route tables of the TGW.

18. The non-transitory computer-accessible storage medium as recited in claim 16, storing further program instructions that when executed on the processor:

receive, via a programmatic interface at a configuration manager of the cloud computing environment, a request to create the multi-appliance logical connection, wherein the multi-appliance logical connection is created in response to the request, and wherein, in the request, the group of network addresses is indicated via one or more of: (a) an identifier of a subnet of the first VPC or (b) a Classless Inter-Domain Routing (CIDR) block.

19. The non-transitory computer-accessible storage medium as recited in claim 16, wherein the first software-defined appliance comprises software run on a compute instance of a virtualized computing service of the cloud computing environment.

20. The non-transitory computer-accessible storage medium as recited in claim 16, storing further program instructions that when executed on the processor:

receive, at the cloud computing environment via one or more programmatic interfaces, a request to auto-scale software-defined appliances, wherein the second software-defined appliance is launched based at least in part on the request to auto-scale.

* * * * *